(12) United States Patent
Marcinkiewicz

(10) Patent No.: US 6,441,580 B2
(45) Date of Patent: Aug. 27, 2002

(54) BRUSHLESS MACHINE CONTROL

(75) Inventor: Joseph Gerald Marcinkiewicz, St. Charles, MO (US)

(73) Assignee: Switched Reluctance Drives, Ltd., Harrogate (GB)

( * ) Notice: Subject to any disclaimer, the term of this patent is extended or adjusted under 35 U.S.C. 154(b) by 0 days.

(21) Appl. No.: 09/738,468

(22) Filed: Dec. 15, 2000

(30) Foreign Application Priority Data

Dec. 17, 1999 (GB) .............................................. 9929995

(51) Int. Cl.[7] .................................................. H02P 1/24
(52) U.S. Cl. ........................ 318/727; 318/701; 318/702; 318/254; 318/138; 318/439
(58) Field of Search ................................. 318/701, 700, 318/254, 138, 439, 128, 727

(56) References Cited

U.S. PATENT DOCUMENTS

| | | | |
|---|---|---|---|
| 5,467,025 A | * 11/1995 | Ray | ............................ 318/701 |
| 5,696,430 A | 12/1997 | Erdman et al. | |
| 6,091,215 A | 7/2000 | Lovett et al. | |
| 6,225,767 B1 | * 5/2001 | Lovett et al. | ............... 318/254 |

FOREIGN PATENT DOCUMENTS

WO  WO 99/62666  12/1999

OTHER PUBLICATIONS

Stephenson, Dr. J.M., et al., "The Characteristics, Design and Applications of Switched Reluctance Motors and Drives," PCIM '93, Conference and Exhibition, Seminar 5, 1993, Nürnberg, Germany, pp. 1–68.

Barrass, Dr. P.G., et al., "Torque Control of Switched Reluctance Drives," ICEM '96 Proceedings, International Conference on Electrical Machines, 1996, Vigo, Spain, vol. 1, pp. 254–259.

Mir, Sayeed, et al., "Switched Reluctance Motor Modeling with On–Line Parameter Identification," IEEE Industry Applications Society Annual Meeting, Louisiana, U.S.A., 1997, pp. 333–340.

Weiner, C., et al., "Flux–Linkage Control of Fully–Pitched Switched Reluctance Motors," EPE '99, 8th European Conference on Power Electronics and Applications, 1999, Lausanne, Switzerland, pp. 1–9.

* cited by examiner

Primary Examiner—Karen Masih
(74) Attorney, Agent, or Firm—Dicke, Billig & Czaja, P.A.

(57) ABSTRACT

A switched reluctance machine uses a Hall-effect device to detect the flux in the flux path for each machine phase. The flux signal from the Hall-effect device is fed back to a controller which compares the flux feedback with a demand signal to produce an error signal. The error signal is used to control the machine flux using a control law function actuating timed switches for each phase.

31 Claims, 3 Drawing Sheets

BRUSHLESS MACHINE CONTROL

CROSS-REFERENCE TO RELATED APPLICATION

The subject matter of this application is related to the subject matter of Application No. GB 9929995.0, filed Dec. 17, 1999, priority to which is claimed under 35 U.S.C. § 119 and which is incorporated herein by reference.

BACKGROUND OF THE INVENTION

1. Field of the Invention

This invention relates to the control of electronically switched, brushless machines, such as switched reluctance machines, permanent magnet machines and hybrids thereof.

2. Description of Related Art

The typical switched reluctance machine, for example, comprises a rotor, defining rotor poles, a stator defining stator poles, and a set of windings arranged in relation to the stator poles to define one or more phases. In a reluctance machine, energization of one or more phase windings sets up a magnetic flux circuit including the associated stator poles, urging the rotor into a position of minimum reluctance. Timing the sequential energization of the windings according to rotor position induces rotor movement. Switched reluctance machines are well known. More detail is provided in the paper 'The Characteristics, Design and Applications of Switched Reluctance Motors and Drives' by Stephenson and Blake, presented at the PCIM '93 Conference and Exhibition at Nurnberg, Germany, Jun. 21–24, 1993 which is incorporated herein by reference. As is well known in the art, these machines can be operated as motors or generators simply by altering the timing of the application of the excitation to the phase windings.

As explained in the above paper, the method of torque production in a switched reluctance machine is quite different from that in conventional machines, e.g. induction or synchronous machines, which are operated by rotating waves of magneto-motive force (mmf) and in which the torque is produced by the interaction of a magnetic field with a current flowing in a conductor. Such machines are known as 'electromagnetic' machines and encompass, e.g., so-called brushless DC machines in which the current is in stator coils and the field is produced by permanent magnets on the rotor. By contrast, switched reluctance machines are purely 'magnetic' machines, where the torque is produced solely by the magnetic field as the reluctance of the magnetic circuit changes. These machines require the use of permanent magnets. The rotor and the stator are made of unmagnetized, but magnetizable metal, such as electrical sheet steel which is a typical "soft" magnetic material. It follows that the methods of controlling the two types of machine are quite different, since the control is related to the method of torque production. In general, the control methods used for conventional sinusoidally fed conventional machines are quite inappropriate for switched reluctance machines.

FIG. 1 shows a typical switched reluctance machine in cross section. In this example, the stator 10 has six stator poles 12, and the rotor 14 has four rotor poles 16. Each stator pole carries a coil 18. The coils on diametrically opposite poles are connected in series to provide three phase windings. Only one phase winding is shown, for clarity. The control of the switched reluctance machine can be achieved in a variety of ways. The machine could be controlled in an open-loop fashion, i.e. as commonly used for stepping motors. In this regime, the phase windings in the machine are sent pulses in turn and it is assumed that the rotor lines up with each pair of stator poles in turn, i.e. the position of minimum reluctance for that phase which is excited. Of course, because the system is open-loop, there are no means of knowing if the rotor has moved or not. To remove this uncertainty, it is conventional to use a rotor position detection scheme of some sort which provides a signal representative of rotor position. The excitation can then be applied as a function of the position. Such machines are often referred to as "rotor position switched machines".

Since current in the windings is relatively easy to measure, closed-loop control is commonly accomplished by monitoring and controlling the energizing current in the windings. However, the desired output of the machine is usually torque, position or speed, and current has a highly non-linear relationship to all of these. The result is that current control techniques generally have inaccuracies in the output, such as torque ripple, position error or speed error.

A typical switched reluctance drive is shown in FIG. 2. In this example, the machine 36 corresponds to that shown in FIG. 1. The three phase windings A, B and C are switched onto a d.c. supply V by a set of power electronic switches 48. The moments at which the switches operate are determined by the controller 38, which may be implemented either in hardware or in the software of a microcontroller or digital signal processor. The firing signals are sent to the switches via a data bus 46. Closed loop current feedback is provided by sensing the phase currents by a current sensor 44 and feeding back a signal proportional to phase current. The control algorithms often include a proportional (P), proportional-plus-integral (P+I), time optimal, feedback linearized, proportional/integral/derivative (PID) function, or one of many others as is well understood in the art. It is also common for an outer control loop of position or speed to be provided by feeding back a rotor position signal from a position detector 40.

In operation, a current demand $i_D$ on line 42 is provided to the controller and this regulates the current in the windings, according to the particular control scheme adopted, to produce the desired output from the machine. Those skilled in the art will be familiar with the many variations of current controllers which exist, each of which has its own merits, but all of them suffer from the problems of non-linearity between the controlled variable and the machine output described above.

It has been recognized by the inventor that the more fundamental control variable in a switched reluctance machine is the flux which is set up in the magnetic circuit in the machine when a phase winding is energized. The flux is directly responsible for the force which acts on the rotor to urge it to a position of minimum reluctance, i.e. to pull the rotor round, with respect to the energized stator poles. Embodiments of this invention use closed loop determination and control of flux to achieve much better performance from the machine than has hitherto been possible with closed loop control of current.

In the paper 'Torque Control of Switched Reluctance Drives' by P. G. Barrass and B. C. Mecrow, ICEM 96 Proceedings, International Conference on Electrical Machines, Sep. 10–12, 1996, Vigo, Spain, Vol 1, pp 254–259, incorporated herein by reference, there is a proposal to provide torque control by reference to flux linkage reference waveforms using a look-up table that stores fixed values of flux ramps for co-ordinates of supply voltage, phase current and rotor position. The flux values and co-ordinates are specific to a particular motor. At any instant the pre-stored values of flux and torque are chosen from fed back measurements of phase current and the stored machine data. There is a fixed relationship between the monitored variables and the values of the flux waveforms in the look-up table that are used to produce an output for a given motor. This system is essentially still a closed loop current controller, since the parameter fed back and the parameter controlled is current.

Up to now it has not been proposed to control flux without deriving or estimating values based on stored fixed values particular to a machine and its characteristics, based on the feedback of phase current.

SUMMARY OF THE INVENTION

According to embodiments of the present invention there is provided a brushless electrical machine comprising: a rotor; a stator; at least one phase winding arranged to establish flux in a magnetic circuit in the machine; and transducer means arranged in relation to the magnetic circuit to produce a flux signal indicative of the flux in a flux path associated with the at least one phase winding.

According to embodiments of the invention the machine, which can be run as a motor or a generator, derives the flux signal indicative of the flux itself from the magnetic circuit. The flux signal may be the output of a transducer arranged to measure directly the flux in the magnetic circuit.

The transducer means may be arranged directly in the flux path. To avoid the transducer being an excessive contributor to the reluctance of the magnetic circuit, it may be arranged in the flux path but so that it only takes up a fraction of the area of the flux path. The transducer means can conveniently be arranged in a recess of a pole face of a stator pole or be deposited on a pole face.

The transducer means can be any device known to produce an output that is indicative of the flux present. One example is a Hall-effect device that produces a voltage output that is directly proportional to the flux.

Embodiments of the invention enable direct flux control of the machine which has been found to be more accurate and is more amenable to on-line adaptation than the current-based control previously used. It uses a real-time determination of flux, as opposed to a selection from a set of stored values. It is, thus, adaptable to different types of machine and is not dedicated to a specific machine.

Embodiments of the invention also extend to a brushless electrical machine drive system comprising a brushless electrical machine having a rotor, a stator and at least one phase winding arranged to establish flux in a magnetic circuit in the machine; transducer means arranged in relation to the magnetic circuit to produce a flux signal indicative of the flux in a flux path associated with the at least one phase winding; switch means electrically connected with the at least one phase winding; and flux control means having an input signal representing the demanded output of the machine, which control means are responsive to the input signal and the flux signal to produce control signals for controlling the flux in the or each phase winding.

The flux control means are responsive to the input signal and the flux signal to produce the control signals according to a proportional, proportional-plus-integral, proportional/integral/derivative, time optimal or feedback linearized control law.

Preferably, the flux control means further includes means for timing the control signals for actuating the excitation means.

Embodiments of the invention also extend to a method of controlling a brushless electrical machine having a rotor, a stator and at least one phase winding, the method comprising: arranging transducer means in a magnetic circuit of the machine to produce a flux signal indicative of the flux in the at least one phase winding; producing an input signal representing the demanded output of the machine; controlling energization of the at least one phase winding in response to the input signal and the flux signal.

BRIEF DESCRIPTION OF THE DRAWINGS

The present invention can be put into practice in various ways, some of which will now be described by way of example with reference to the accompanying drawings in which:

FIG. 4b is a radial cross-section of the machine of FIG. 4a.

DETAILED DESCRIPTION OF PREFERRED EMBODIMENTS

Figure 3:
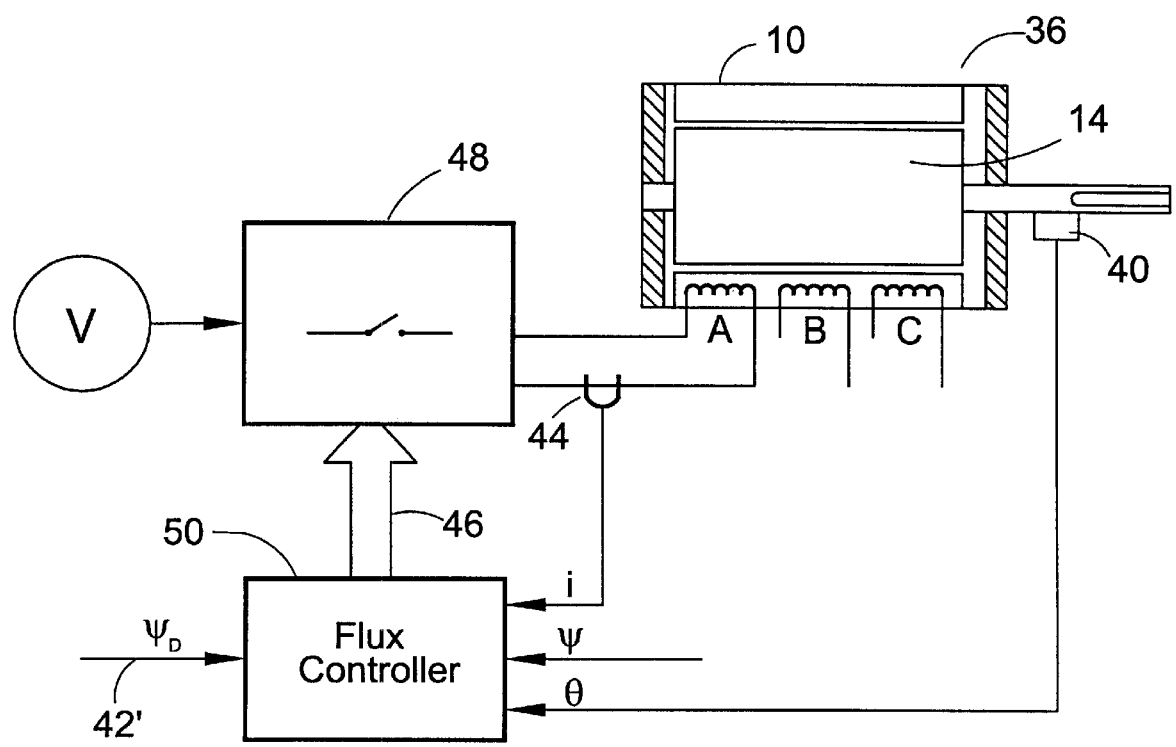
FIG. 3 is a schematic block diagram of a control system for a switched reluctance machine incorporating an embodiment of the invention.

Referring to FIG. 3, a first embodiment of a switched reluctance drive system according to the invention includes a switched reluctance machine 36 having a laminated stator 10 and a laminated rotor 14, both made from soft magnetic material, for example electrical sheet steel, in relation to which is arranged a rotor position transducer (RPT) 40. A flux controller 50 produces firing signals for actuating power electronic switches 48 for controlling the energization of the phase windings A, B and C associated with the stator 10. The schematically illustrated connection of only one phase winding is shown for the sake of clarity, but each phase is independently excitable by actuation of the switches. In an alternative embodiment, the excitation for the windings is provided by an amplifier of known type.

The flux controller 50 is provided with three feedback signals: rotor position signals $\theta$ from the RPT 40; phase current signals i from the current transducer 44; and flux signals $\psi$ proportional to the measured flux in the phase winding. It will be appreciated that each phase winding will have associated with it a current transducer 44 for the current signals 1. Only one is shown for the sake of clarity. The input 42' to the flux controller 50 is a signal representing the desired flux $\psi_D$ in the machine to produce a desired output. In operating the machine as a motor, the desired output is torque, speed or position. In operating the machine as a generator, the desired output is electrical power.

Figure 1:
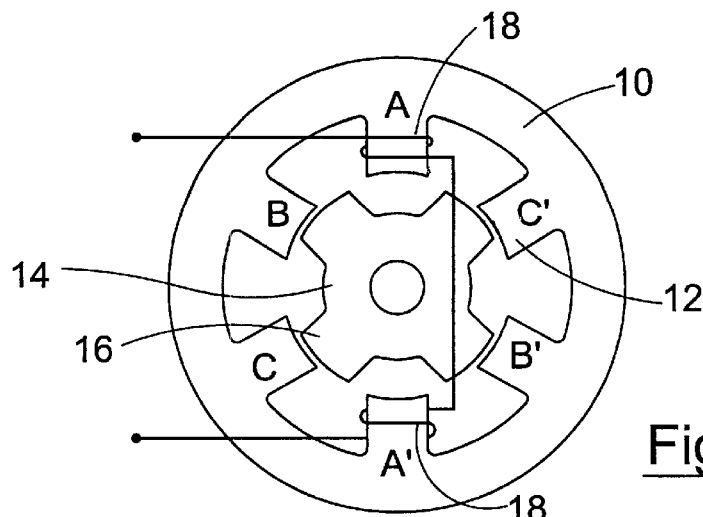
FIG. 1 is a schematic diagram of a known switched reluctance machine.
Figure 2:
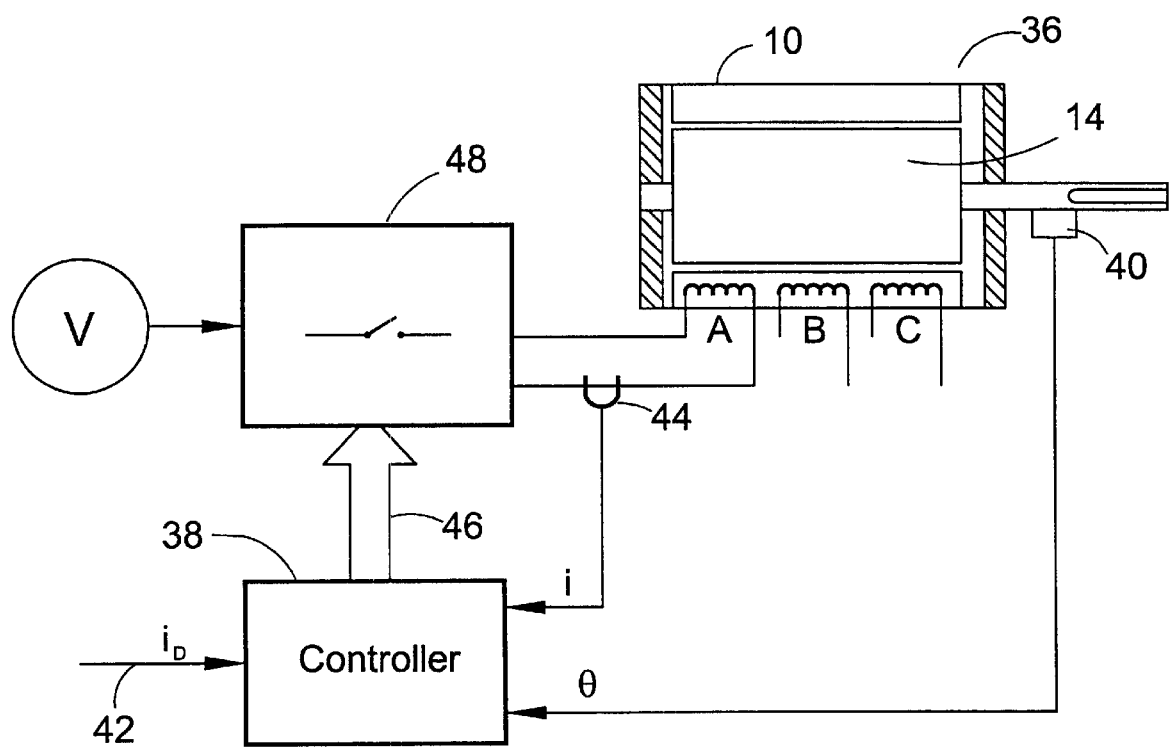
FIG. 2 is a schematic diagram of a known closed loop current controller for a switched reluctance machine.

The flux controller of FIG. 3 is quite different in operation from the controller of FIG. 2. Instead of a current demand controlling the output of the machine, the output is controlled directly by a flux demand: instead of current being the principal parameter fed back to correct the output, flux is now the principal feedback parameter. This is quite different from all known practicable controllers for switched reluctance machines.

FIG. 3 shows the flux controller receiving a flux feedback signal. In one embodiment of the invention, shown in FIG.

Figure 4A:
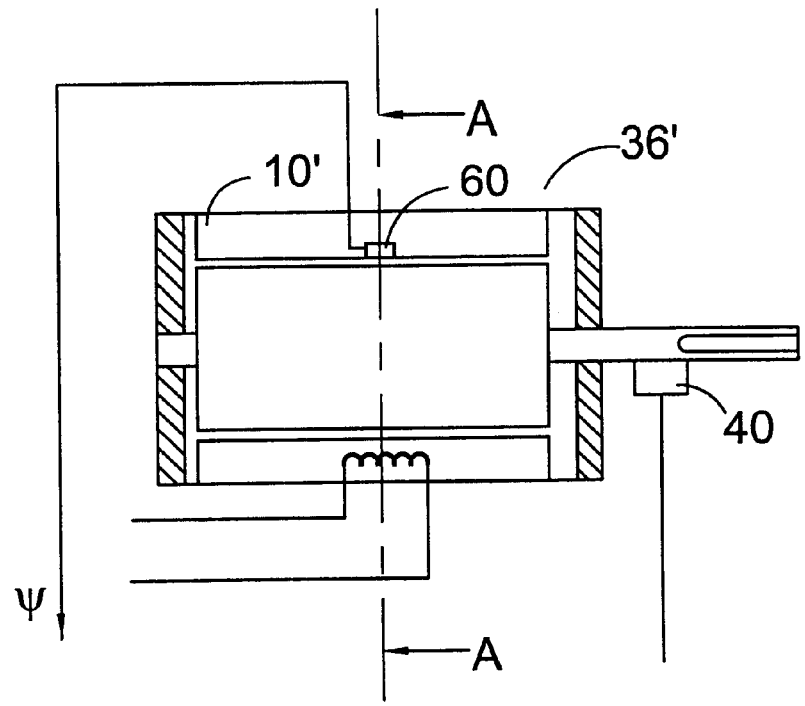
FIG. 4a is a schematic axial cross-section of a reluctance machine according to the invention.
Figure 4B:
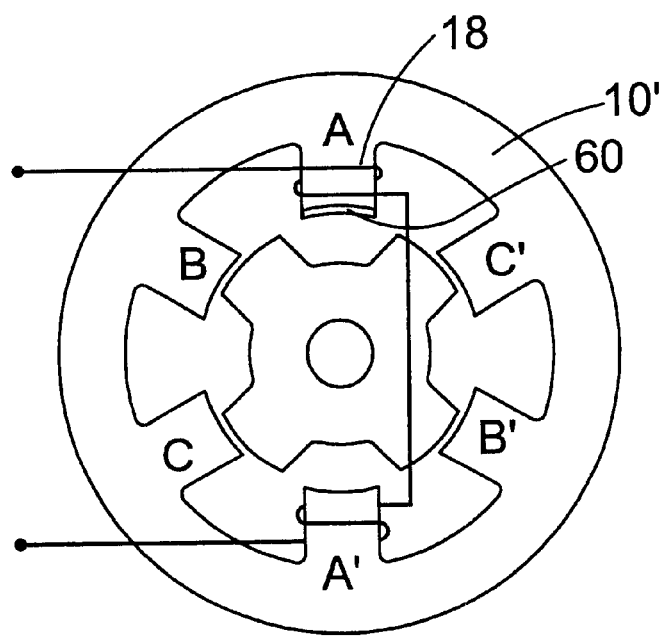

4, this signal is produced by a Hall-effect device 60 which gives an electrical output that is directly proportional to the flux. FIG. 4(a) shows an axial cross-section of a machine 36' suitable for use in the present invention. Viewed along the axis of the machine, at a point along the stator core 10' of the machine, a recess is formed in the pole face. The Hall-effect device 60 is mounted in the recess. A radial cross-section AA through the device is shown in FIG. 4(b). The device 60 could be mounted on the surface of the unmodified pole face of the stator pole, but space in the air gap between aligned rotor and stator poles is limited. In either case the device is in the flux path. While the presence of the Hall-effect device 60 increases the reluctance at the position in which the rotor and stator poles are aligned, the effect of its presence on the reluctance of the flux path is negligible as a proportion of the overall flux path in the stack of laminations. The Hall-effect device 60 is directly in the flux path for that phase. As is well-known, the output of the Hall-effect device is a voltage signal directly proportional to the magnitude of the flux to which it is exposed. Therefore it acts as a flux transducer indicating the flux in the flux path for that phase, and the signal is fed back to the flux controller 50 as shown in FIG. 3. For the sake of clarity, only the Hall-effect device for one phase is shown but it is to be understood that a similar device is provided for each phase or in each airgap of the machine.

The Hall-effect device 60 is situated in the main flux path of phase A and gives a reliable measurement of the flux to which it is exposed. Its output can be scaled to account for the length of the stator core 10' and also for any fringing effects which occur at the ends of the core. The flux transducer 60 need not be positioned as shown in FIG. 4—it may be placed anywhere in relation to the magnetic circuit where it can give an output which reliably transduces the magnitude of the flux in the machine. The indication of the flux is preferably directly or inversely proportional to the transducer output. It need not be linearly proportional as long as the output can be scaled and is an unambiguous indication of flux without reference to other machine parameters or operating conditions.

FIG. 4 shows a Hall-effect device which is small relative to the dimensions of the pole 18. In an alternative embodiment, a thin layer of Hall-effect material is deposited on the pole face to form a larger transducer. In a yet further embodiment, a layer of magneto-resistive material is placed in the flux path to provide a signal proportional to flux in the magnetic circuit. It will be clear to the skilled person that any transducer which indicates the magnitude of flux and provides a suitable output signal can be used in this invention. Examples of other useful transducers are a Gaussmeter and a superconducting interference device (SQUID).

In the flux controller 50 of FIG. 3, the flux feedback signal ψ is compared with the demanded flux on line 42' to produce an error signal. The flux controller can follow any one of a range of control laws, such as proportional, proportional-plus-integral, proportional/integral/derivative, time optimal, feedback linearized.

The machine 36' also has a conventional RPT 40, whose output θ provides timing information to the flux controller 50 in conventional manner. Alternative embodiments use so-called sensorless position detection systems which estimate position from other parameters of the machine, as is known in the art. The flux controller 50 may also receive a current signal i from the current transducer 44, though this is not used in the manner of a conventional current controller: rather, it is used simply to provide overall monitoring of current to ensure that it stays within a predetermined safe level. The flux controller 50 produces firing signals for the switching devices 48 that control energization of the phase windings.

The invention provides a flux control technique for electronically switched brushless machines of various types. It produces a real-time signal of the flux in the magnetic circuit of the machine to which a reference value of flux can be compared to control the machine output. It will be apparent to the skilled person that various modifications and changes can be made to the specifically disclosed embodiments without departing from the invention. The invention is to be limited only by the spirit and scope of the following claims.

What is claimed is:

1. A brushless electrical machine comprising:
   an unmagnetized rotor;
   an unmagnetized stator;
   at least one phase winding arranged to establish flux in a magnetic circuit in the machine including the rotor and stator; and
   a transducer arranged in relation to the magnetic circuit to produce a flux signal indicative of the flux in a flux path associated with the at least one phase winding, the transducer being arranged in the flux path;
   wherein the rotor defines rotor poles and the stator defines stator poles, the rotor and the stator being arranged for relative rotation to define an air gap between the rotor poles and stator poles, the transducer being disposed to border the said air gap.

2. A machine as claimed in claim 1 in which the transducer includes a Hall-effect device.

3. A machine as claimed in claim 1 in which the transducer is attached to the stator pole for the at least one phase winding.

4. A machine as claimed in claim 3 in which the stator poles define pole faces, the transducer being mounted on one of the pole faces for the at least one phase winding.

5. A machine as claimed in claim 4 in which the stator has an axial dimension, the transducer being mounted part way along the said axial dimension.

6. A machine as claimed in claim 1 in which the transducer is operable to produce the flux signal as a voltage or current directly proportional to the flux.

7. A machine as claimed in claim 1 constructed as a reluctance machine.

8. A brushless electrical machine comprising:
   an unmagnetized rotor;
   an unmagnetized stator;
   at least one phase winding arranged to establish flux in a magnetic circuit in the machine including the rotor and stator; and
   a transducer arranged in relation to the magnetic circuit to produce a flux signal indicative of the flux in a flux path associated with the at least one phase winding, wherein the transducer is attached to a stator pole for the at least one phase winding.

9. A machine as claimed in claim 8 in which the transducer includes a Hall-effect device.

10. A machine as claimed in claim 8 in which the transducer is arranged in the flux path.

11. A machine as claimed in claim 8 in which stator poles of the stator define pole faces, the transducer being mounted on one of the pole faces for the at least one phase winding.

12. A machine as claimed in claim 11 in which the stator has an axial dimension, the transducer being mounted part way along the said axial dimension.

13. A machine as claimed in claim 8 in which the transducer is operable to produce the flux signal as a voltage or current directly proportional to the flux.

14. A machine as claimed in claim 8 constructed as a reluctance machine.

15. A brushless electrical machine comprising:
an unmagnetized rotor;
an unmagnetized stator;
at least one phase winding arranged to establish flux in a magnetic circuit in the machine including the rotor and stator; and
a transducer arranged in relation to the magnetic circuit to produce a flux signal indicative of the flux in a flux path associated with the at least one phase winding;
wherein at least one of the rotor and the stator has an axial dimension, the transducer being disposed part way along the said axial dimension.

16. A brushless electrical machine drive system comprising:
a brushless electrical machine having a rotor, a stator and at least one phase winding arranged to establish flux in a magnetic circuit in the machine;
transducer means arranged in relation to the magnetic circuit to produce a flux signal indicative of the flux in a flux path associated with the at least one phase winding, wherein the transducer means is arranged in the flux path of at least one phase winding;
switch means electrically connected with the at least one phase winding; and
flux control means having an input signal representing the demanded output of the machine, which control means is responsive to the input signal and the flux signal to produce control signals for controlling the flux in the or each phase winding;
wherein the rotor defines rotor poles and the stator defines stator poles, the rotor and stator being arranged for relative rotation to define an air gap between the rotor poles and stator poles, the transducer means being disposed to border the air gap.

17. A system as claimed in claim 16 in which the transducer means is a Hall-effect device.

18. A system as claimed in claim 16 in which the transducer means is attached to the stator pole for the at least one phase winding.

19. A system as claimed in claim 18 in which the stator poles define pole faces, the transducer means being mounted on the pole face of one of the stator poles for the at least one phase winding.

20. A system as claimed in claim 19 in which the stator has an axial dimension, the transducer means being mounted part way along said axial dimension.

21. A system as claimed in claim 16 in which the transducer means is operable to produce the flux signal as a voltage or current directly proportional to the flux.

22. A system as claimed in claim 16 constructed and arranged as a switched reluctance machine drive.

23. A system as claimed in claim 16 in which the flux control means is responsive to the input signal and the flux signal to produce the control signals according to a proportional, proportional-plus-integral, proportional/integral/derivative, time optimal or feedback linearized control law.

24. A system as claimed in claim 16, including rotor position detection means operable to produce a rotor position signal indicative of the position of the rotor relative to the stator, and in which the flux control means include timing means responsive to the rotor position signal for timing the control signals for controlling the flux in the at least one phase winding.

25. A system as claimed in claim 16 in which the input signal to the flux control means is a flux demand signal.

26. A brushless electrical machine drive system comprising:
a brushless electrical machine having a rotor, a stator and at least one phase winding arranged to establish flux in a magnetic circuit in the machine;
transducer means arranged in relation to the magnetic circuit to produce a flux signal indicative of the flux in a flux path associated with the at least one phase winding, wherein the transducer means is attached to a stator pole for the at least one phase winding;
switch means electrically connected with the at least one phase winding; and
flux control means having an input signal representing the demanded output of the machine, which control means is responsive to the input signal and the flux signal to produce control signals for controlling the flux in the or each phase winding.

27. A system as claimed in claim 26 in which stator poles of the stator define pole faces, the transducer means being mounted on the pole face of one of the stator poles for the at least one phase winding.

28. A system as claimed in claim 27 in which the stator has an axial dimension, the transducer means being mounted part way along said axial dimension.

29. A system as claimed in claim 26 in which the transducer means is operable to produce the flux signal as a voltage or current directly proportional to the flux.

30. A system as claimed in claim 26 constructed and arranged as a switched reluctance machine drive.

31. A method of controlling a brushless electrical machine having a rotor, a stator and at least one phase winding, the rotor defining rotor poles and the stator defining stator poles, the rotor and the stator being arranged for relative rotation to define an air gap between the rotor poles and stator poles, the method comprising:
arranging a transducer in a magnetic circuit of the machine to produce a flux signal indicative of the flux in the at least one phase winding, the transducer being arranged in the flux path and bordering the air gap;
producing an input signal representing a demanded output of the machine; and
controlling energization of the at least one phase winding in response to the input signal and the flux signal.

* * * * *